US011238082B2

(12) United States Patent
Radhakrishnan et al.

(10) Patent No.: US 11,238,082 B2
(45) Date of Patent: Feb. 1, 2022

(54) TEXT ANALYSIS OF UNSTRUCTURED DATA

(71) Applicant: ServiceNow, Inc., Santa Clara, CA (US)

(72) Inventors: Dileeshvar Radhakrishnan, San Jose, CA (US); Robert Ninness, Amsterdam (NL); Seth Stafford, San Jose, CA (US); Aida Rikovic Tabak, Amsterdam (NL); Shayan Shahand, Amsterdam (NL); Sumana Ravikrishnan, Sunnyvale, CA (US); Abhijith Nagarajan, Amstelveen (NL); Prabhakaran Subramani Thandayuthapani, Amsterdam (NL); Marta Penzo, Amsterdam (NL); Ciprian Mocanu, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 702 days.

(21) Appl. No.: 15/729,250

(22) Filed: Oct. 10, 2017

(65) Prior Publication Data

US 2019/0102455 A1    Apr. 4, 2019

Related U.S. Application Data

(60) Provisional application No. 62/568,087, filed on Oct. 4, 2017.

(51) Int. Cl.
*G06F 16/35* (2019.01)
*G06F 3/0482* (2013.01)
(Continued)

(52) U.S. Cl.
CPC .......... *G06F 16/358* (2019.01); *G06F 3/0482* (2013.01); *G06F 40/103* (2020.01);
(Continued)

(58) Field of Classification Search
None
See application file for complete search history.

(56) References Cited

U.S. PATENT DOCUMENTS 5,631,825 A * 5/1997 van Weele ......... G05B 19/0426
700/83
6,009,122 A    12/1999 Chow
(Continued)

OTHER PUBLICATIONS

Cui Xiwen; "Visual Analysis of Financial News Articles", Jan. 1, 2015 (XP055553380); retrieved from URL:https://www.cse.ust.hk/ug/fyp/posters/gallery/2015/2014-2015_COMP_4_HUA1.pdf (retrieved on Feb. 7, 2019).
(Continued)

*Primary Examiner* — Thu N Nguyen
(74) *Attorney, Agent, or Firm* — Fletcher Yoder PC (57) ABSTRACT

Systems, methods, and media are presented to analyze unstructured text. Unstructured data is retrieved from a user inputs or records. The user inputs include an incident report or a problem report. Text words in the unstructured data are identified. A number of occurrences of each text word is counted. The text words are displayed in a word cloud by displaying each of the text words with a size corresponding to the number of occurrences of the respective text word. A larger number of occurrences results in a larger size of the respective text word when displayed. At least one trendline for occurrences for a corresponding text word is also displayed.

20 Claims, 7 Drawing Sheets

(51) Int. Cl.
*G06F 40/103* (2020.01)
*G06F 40/174* (2020.01)
*G06F 40/205* (2020.01)
*G06F 40/247* (2020.01)
*G06F 40/284* (2020.01)

(52) U.S. Cl.
CPC .......... *G06F 40/174* (2020.01); *G06F 40/205* (2020.01); *G06F 40/247* (2020.01); *G06F 40/284* (2020.01)

(56) References Cited

U.S. PATENT DOCUMENTS

| | | |
|---|---|---|
| 7,028,301 B2 | 4/2006 | Ding |
| 7,062,683 B2 | 6/2006 | Warpenburg |
| 7,131,037 B1 | 10/2006 | LeFaive |
| 7,139,752 B2 | 11/2006 | Broder et al. |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vampenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,239,857 B2 | 1/2016 | Trinon |
| 9,535,737 B2 | 1/2017 | Joy |
| 9,542,259 B1* | 1/2017 | McEwen ............ G06F 11/0793 |
| 9,557,969 B2 | 1/2017 | Sharma |
| 9,645,999 B1* | 5/2017 | Ciulla .................. G06F 16/358 |
| 9,792,387 B2 | 10/2017 | George |
| 2002/0194029 A1* | 12/2002 | Guan ..................... G06Q 10/10 705/3 |
| 2005/0289138 A1 | 12/2005 | Cheng et al. |
| 2006/0229902 A1* | 10/2006 | McGovern ............ G06Q 50/10 705/321 |
| 2014/0025626 A1 | 1/2014 | Mefford et al. |
| 2014/0275819 A1* | 9/2014 | Kassem ................. A61B 5/743 600/301 |
| 2016/0378859 A1* | 12/2016 | Banik .................. G06F 16/358 707/708 |

OTHER PUBLICATIONS

Extended European Search Report for European Application No. 18198403.0 dated Feb. 20, 2019; 7 pgs.
Anonymous: "Document Properties of D1", Jan. 1, 2016 (XP055814693); retrieved on Jun. 16, 2021.
Anonymous: "FYP/FYT Video Trailer Gallery (2014-2015) | HKUST CSE", Jan. 1, 2016 (XP055814695); [retrieved from the internet Jun. 16, 2021: https://www.cs.ust.hk/ug/fyp/posters/gallery/?].
European Office Action for EPO Application No. 18198403.0 dated Jun. 22, 2021; 8 pgs.

\* cited by examiner

TEXT ANALYSIS OF UNSTRUCTURED DATA

CROSS-REFERENCE TO RELATED APPLICATIONS

This application claims the benefit of Provisional Application Ser. No. 62/568,087, filed Oct. 4, 2017, entitled "PLATFORM COMPUTING ENVIRONMENT AND FUNCTIONALITY THEREOF," which is incorporated by reference herein in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Computer resources may share significant amounts of data. Some of the data may be formatted into a format that a receiving device knows how to interpret. For example, if a form is completed using drop-downs of enumerated items, the receiving device may be configured to deal with the enumerated items. However, in some scenarios, at least a portion of the data may be "unformatted" in that the data may be received without a specific format to indicate how to interpret the incoming data. For example, when a form includes a comments section that receives text-based and/or number-based inputs, the data may be at least partially unformatted. Since the form includes, unformatted data, the form may be difficult to process since automated processing of the incoming data does not have a strict format under which the data is to be interpreted.

BRIEF DESCRIPTION OF THE DRAWINGS

The description herein makes reference to the accompanying drawings, wherein like reference numerals refer to like parts throughout the several views.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) devices are increasingly important in an electronics-driven world in which various assets are interconnected within a distributed context (e.g., via the Internet). Generally, these assets are supported using records (e.g., incident reports, problem reports, etc.) However, when supporting large numbers of users, these records may be numerous (e.g., tens, hundreds, or thousands) very quickly. To assist with analyzing the records, reports may be made on the records to track and analyze common issues. To do this, at least a portion of the records may be structured data with a limited number of responses (e.g., made from drop down lists). This data can be interpreted automatically. However, the records may also include unstructured data that may be manually entered by users (e.g., user-written description reporting problem/incident, IT user writing problem report closure notes, etc.) that has nearly unlimited possible combinations of characters in the unstructured data. To analyze this data, human categorization may be used to attempt to categorize incoming records, but this categorization may be incorrect, and later analysis of the potentially voluminous records may be difficult.

To aid in analyzing the unstructured data, the unstructured data may be retrieved for any number of records and analyzed by counting occurrences of certain strings of characters (e.g., words or phrases) in the unstructured data. The occurrences of words the strings of characters may be presented in a word cloud and a trendline to show a frequency and trend of the words and/or their related topics among potentially numerous entries, such as open or closed incidents. Also, using this analysis, the categorization of records may be confirmed as correct or deemed incorrect and fixed. Furthermore, these trending topics may be analyzed may be used to assign/check a priority or severity of the related incidents. Moreover, text with small frequency may be identified as corresponding to transient and/or limited occurrence events.

Figure 1:
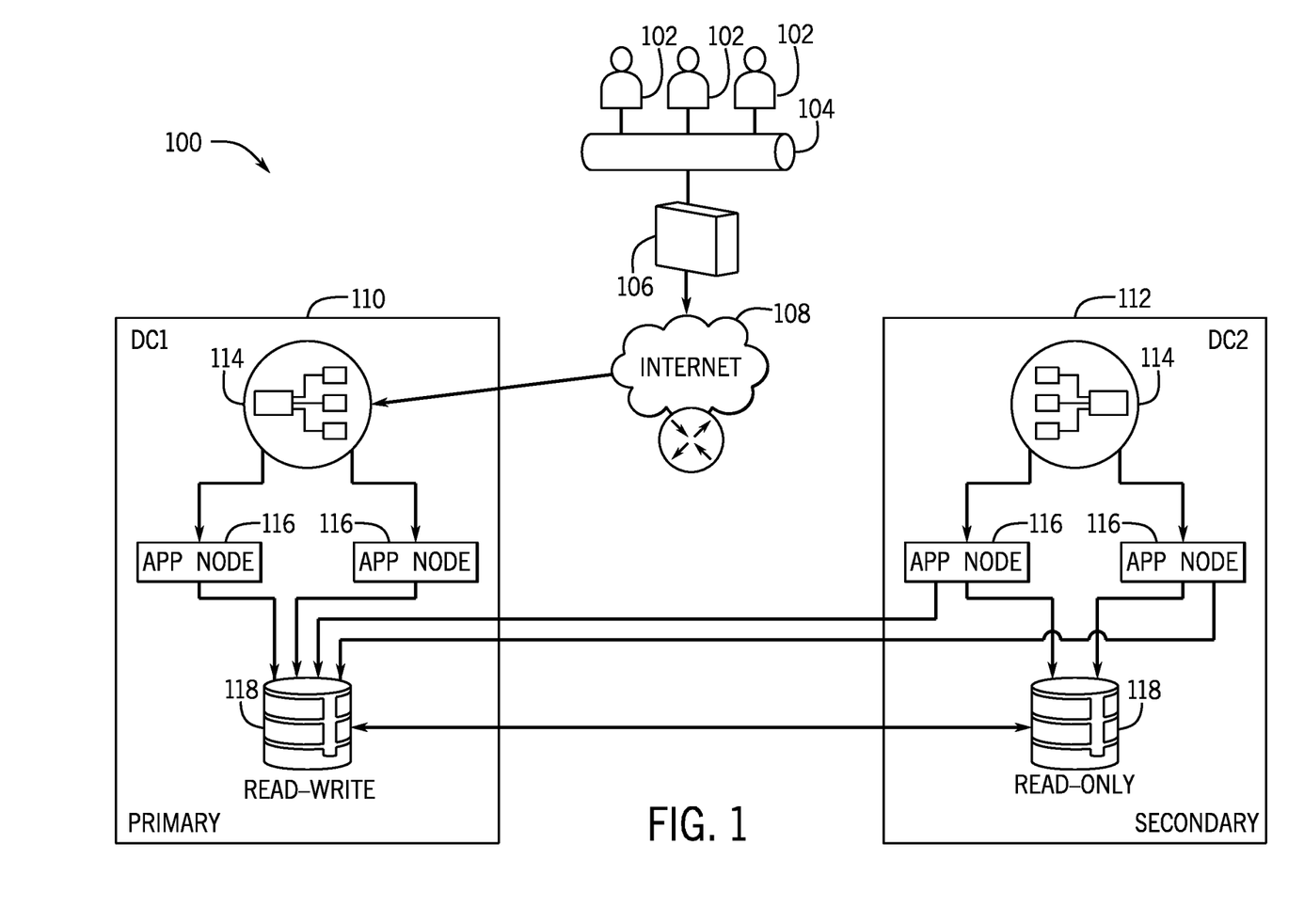
FIG. 1 is a block diagram of a distributed computing system, in accordance with an embodiment.

By way of introduction, FIG. 1 is a schematic of an embodiment of a multi-instance architecture 100 that may be utilized in a distributed computing system. As shown, one or more clients 102 are connected to a customer network 104. The customer network 104 may be protected by a firewall 106 to block unwanted communications the Internet 108. The one or more clients 102 may access first and second virtual machines 158, 160 via the Internet 108. The one or more clients 102 may include any suitable computing system, such as a mobile phone, a tablet computer, a laptop computer, a notebook computer, a desktop computer, or any other suitable computing device or combination of computing devices. Moreover, each client 102 may include client application programs running on the computing devices.

In the illustrated embodiment, a first virtual machine 110 is a primary virtual machine and a second virtual machine 112 is a secondary virtual machine. The first and second virtual machines 110, 112 may be disposed in different data centers. Other embodiments may include more than two virtual machines (e.g., multiple secondary virtual machines). As shown, each of the virtual machines 110, 112 includes at least one load balancer 114, multiple application nodes 116, and a database 118. One or more application services hosting the application nodes 116 may include any computing system, such as a desktop computer, laptop computer, server computer, and/or any other computing device capable of providing functionality from an application program to the client 102. The one or more application nodes run application programs on the application server to provide functionality to the client 102.

The load balancer 114 may route computing communication traffic to respective elements. For example, the load balancer 114 may operate as a proxy or reverse proxy, for a service, such as an Internet-delivered service, provided to one or more remote clients 102 via the network 104. Routing functions of the load balancer 114 may be configured directly or may utilize a Domain Name System (DNS)-based scheme. The load balancer 114 may coordinate requests from remote clients 102 to simplify client 102 access by masking the internal configuration of the virtual machines 110, 112 from the remote clients 102 and/or to provide numerous potential destinations (e.g., servers) via a single address to provide the platform the ability to manage burdens on hardware in the multi-instance architecture 100.

The database 118 may include a series of tables containing information about assets and services controlled by the client 102. In some embodiments, the database 118 may be implemented as a relational database management system (RDBMS), an object database, an XML database, a configuration management database (CMDB), a management information base (MIB), one or more flat files, other suitable non-transient storage mechanisms, or a combination thereof. By way of non-limiting example, in some embodiments, that database 118 may include an XML database and a CMDB. While limited examples are described, the database 118 may be configured to include any suitable database type. Further, the multi-tenant architecture may include one, two, three, or any suitable number of databases 118 of any suitable database type or combination thereof. In some embodiments, the platform may include one or more other database servers that includes one or more databases 118. The database servers are configured to store, manage, or otherwise provide data for delivering services to the client 102.

The database server and/or databases 118 are accessible by the application nodes 116, the client 102, and/or other devices external to the databases 118. In some embodiments, more than a single database server may be utilized for a virtual machine. Furthermore, in some embodiments, a platform including the virtual machines 110, 112 may have access to one or more databases external to the platform entirely.

In the illustrated embodiment, the database 118 of the primary virtual machine 110 is read-write and the database 118 of the secondary virtual machine 112 is read-only. The databases 118 are replicated via MySQL binlog replication for near real-time replication between the primary database 118 and the secondary database 118. As shown, the application nodes 116 of the primary virtual machine 110 may access the primary database 118, while the applications nodes 116 of the secondary virtual machine 112 may access both the primary database 118 and the secondary database 118.

Each customer may have its own dedicated virtual machines 110, 112 and database processes. Further, full and incremental backups may be selectively scheduled (e.g., daily, weekly, bi-weekly, monthly, etc.). The multi-instance architecture 100 results in full instance redundancy for all production instances with near-real-time replication and no comingling of data between customers. By providing customers with their own database(s) 118, customers are isolated from database maintenance and/or database failure of other customers. Further, maintenance and repair windows are shorter in multi-instance architectures. In some embodiments, a client 102 may pull data from multiple different databases 118 distributed over multiple virtual machines 110 and/or data centers. The pulled data may then be combined and used as inputs to perform a task, such as dynamic scheduling of service appointments.

Figure 2:
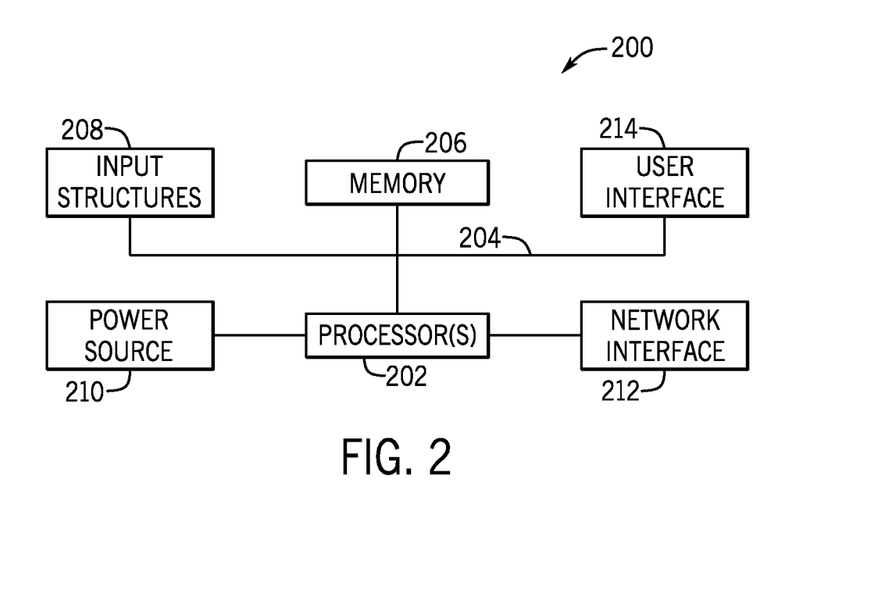
FIG. 2 is a block diagram of a computing device utilized in the distributed computing system of FIG. 1, in accordance with an embodiment.

FIG. 2 generally illustrates a block diagram of an embodiment of an internal configuration of a computing device 200. With respect to FIG. 1, the computing device 200 may be an embodiment of the client 102, the application nodes 116, a virtual machine 110, 112, a database server (e.g., database 118), other servers in a platform utilizing the multi-instance architecture 100, or a combination thereof. These devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the computing device 200 includes one or more processors 202, one or more busses 204, memory 206, input structures 208, a power source 210, a network interface 212, a user interface 214, and/or other computer components useful in performing the functions described herein.

The one or more processors 202 may include a processor capable of performing instructions stored in the memory 206. For example, the one or more processors may include microprocessors, system on a chips (SoCs), or any other circuitry capable of performing functions by executing instructions, such as instructions stored in the memory 206. Additionally or alternatively, the one or more processors 202 may include application-specific integrated circuits (ASICs), field-programmable gate arrays (FPGAs), and/or other devices that may perform the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 can be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204. The input structures 208 may also monitor operating conditions (e.g., temperatures) of various components of the computing device 200, such as the one or more processors 202.

The power source 210 can be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks. The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), WiFi, infrared, and/or other suitable protocols.

A user interface 214 may include a display that is configured to display images transferred to it from the one or more processors 202. In The display may include a liquid crystal display (LCD), a cathode-ray tube (CRT), a light emitting diode (LED) display, an organic light emitting diode display (OLED), or other suitable display. In addition and/or alternative to the display, the interactive user interface 214 may include other devices for interfacing with a user. For example, the interactive user interface 214 may include lights (e.g., LEDs), speakers, haptic feedback, and the like.

As such, there may be an example of a client 102, where the client 102 may access a service portal (e.g., available from SERVICENOW® using the NOW PLATFORM®) to facilitate support of one or more client devices or services. The service portal may be displayed using a client 102. The client 102 may perform a task on the service portal. For example, the service portal may be used to make requests through service catalogs, access application development tools, generate ad hoc snapshots of current data, to save/share/publish/export reports from data, submit a complaint, submit a technology work order).

Information input into the service portal and/or other aspects of the multi-instance architecture 100 may include user input that may be unstructured data. Unstructured data includes data (e.g., strings of characters) that are at least partially unformatted. For example, the incoming data may be comments that are input as text words that may vary from entry to entry even if the encoding of characters uses an understood format (e.g., ASCII). A text word includes any string of characters (e.g., alphanumeric characters) that form an indivisible unit with meaning. For example, a text word may refer to any string of characters between white spaces in an entry. For instance, the text word may include a recognizable word, an acronym, a number, or any combination thereof. Since the incoming data may be unstructured data, the data may be difficult to parse and/or analyze when received in large amounts. Accordingly, a text analytics interface may be provided to enable analysis of such incoming data. In some embodiments, the text analytics interface may provide text analytics as a part of performance analytics that may be used to analyze performance of components (e.g., server) and/or of a system (e.g., distributed computing system). For example, the text analytics may be one of many available performance analytics use to analyze the system and/or its components. Indeed, the text analytics may utilize components of a performance analytics, such as a data collector that is used for other performance analytics.

Figure 3:
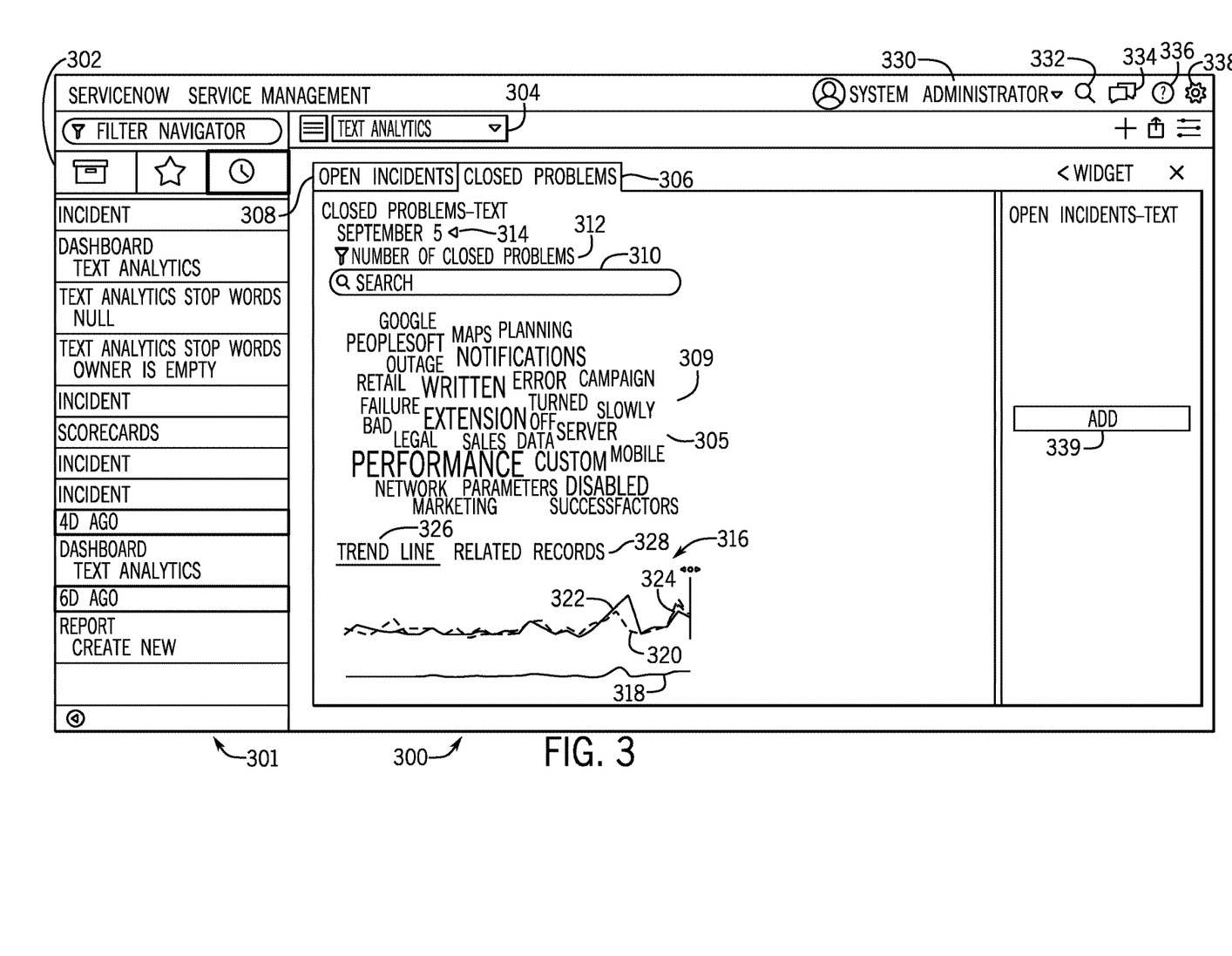
FIG. 3 is a text analytics interface that may be used in the distributed computing system of FIG. 1, in accordance with an embodiment.

FIG. 3 illustrates a text analytics interface 300. The text analytics interface 300 includes a sidebar 301 that includes a menu 302 that may be used to navigate through the text analytics interface 300 and/or through other interfaces within the service portal. Additionally or alternatively, the menu 302 may be used to store previous locations accessed in the service portal and/or a history of searches within the text analytics interface and/or the service portal.

Within the text analytics interface 300, a drop-down 304 may be used to select text analysis as one of several analyses types. As previously noted, text analysis may be used to analyze unstructured text received in an incident report or other reports generated by user inputs into the report. As illustrated, the text analytics interface 300 includes an analysis frame 305. The analysis frame 305 includes two tabs: a closed problems tab 306 and an open incidence tab 308. The closed problems tab 306 corresponds to incidence that have been addressed and closed, and the open incidence tab 308 may be used to analyze incidents that are still open. Although the illustrated embodiment includes only two frames, any number of frames may be included in the analysis frame 305. Furthermore, the analysis frame may include any subjects in which analysis of unstructured text may be beneficial, such as user comments in sales, suggestions for services, and/or other user-based comment scenarios.

Within the closed problems tab 306, a word cloud 309 may be used to display different text words that have occurred in reports that are already closed. In some embodiments, the word cloud (and its component word frequencies) may be calculated at runtime of the text analytics interface 300 to avoid adversely impacting performance of the instance on which the text analytics interface 300 is run. Additionally or alternatively, in some embodiments, the compilation of the word cloud 309 may be run periodically to reduce potential delays in opening the text analytics interface 300 with the word cloud 309. Indeed, the word cloud 309 may be used to quickly view a high level summary of tens, hundreds, or thousands of reports at a glance. As illustrated, as a text word occurs more frequently between reports, a size of the text word in the word cloud 309 increases. In some embodiments, the size of the text word may be increased by each report that include the text word. In other words, multiple occurrences of the text word in a single report do not increase the size of the word beyond the size of the first word. In other embodiments, the size of the word may be increased by each appearance in any report being analyzed. In other words, multiple occurrences of the text word in a character string of a single report may each increase the size of the text word in the word cloud 309.

As will be discussed, in some embodiments, a text word in the word cloud 309 may be selected to drill down (e.g., create a new word cloud based only on reports that include the selected text word). Additionally or alternatively, a word may be selected manually by typing in a word into a search bar 310 to then select only reports that include the typed word. As illustrated, the text analytics interface 300 may also include a filter 312 that indicates how reports are filtered. Since the illustrated closed problems tab 306 corresponds only to close problems, the filter 312 indicates that the word cloud is generated using number of closed problem reports to determine a size for each of the text words in the word cloud 309. In some embodiments, this filtering may be changed to also include open incidence and/or other types of reports. For example, the potential subject matter may pertain to any key performance indicator (KPI) that may be used to analyze data using structured data from the reports, unstructured data from the reports, or a combination thereof. For example, the KPIs may include average incident resolution time by category, incidents assigned more than once by category, number of incidents by category, number of incidents per month by category, number of repeated incidents, remotely resolved incidents, first time resolution rate by category, incident resolution within a service level agreement by category, average work effort for resolving incidents by category, number of incidents per problem, number of problems by state and asset, average problem resolution time, other KPIs, or a combination thereof.

A period of time over which the word cloud 309 is analyzed may be selected using a date picker 314. The date picker 314 may be used to select a date before which the analysis occurs. For example, September 5 may be used to analyze reports that predate September 5. In some embodiments, the date picker may be used to select only dates after the selected date (e.g., after September 5) and/or may be used to select a range of dates between two selected dates.

In addition to the word cloud 309, a trendline interface 316 may be provided to analyze the unstructured data. As illustrated, the trendline interface 316 includes trendlines 318, 320, 322, and 324. These trendlines 318, 320, 322, and 324 correspond to the most commonly occurring text words in the word cloud 309 over a period of time that is a default time, chosen using the date picker, and/or another date selection mechanism. The trendlines 318, 320, 322, and 324 show how frequently the text words in the word cloud 309 occurred at various intervals through the period of time. In some embodiments, a trendline may correspond to a group (e.g., phrase) of text words and/or related records occurring together. In the illustrated embodiment, four trendlines 318, 320, 322, and 324 are displayed. However, in some embodiments, a different number of trendlines may be displayed. For example, an IT manager may configure the trendline interface 316 to display 1, 2, 3, 4, or more trendlines.

The trendline interface 316 may display other information simultaneous with or alternative to the trendlines 318, 320, 322, and 324. For example, in some embodiments, when a trendline tab 326 is selected, the trendlines 318, 320, 322, and 324 are displayed in the trendline interface 316. In some embodiments, when a related records tab 328 is selected, records related to (e.g., containing) the text words in the word cloud 309. In some embodiments, the related records displayed in the related records tab 328 may be limited by a separate configurable menu. For example, the trendline interface 316 may include a top percentage (e.g., 10% or 1,000 records) of text words while related records may display only a portion (e.g., 5 most recent records) of the corresponding records.

Since the trendlines 318, 320, 322, and 324 correspond to text words in the word cloud 309, an indicator may be used to indicate these ties. For example, a color used for the trendline may be matched to a color of the text word in the word cloud 309. This color matching may be automatic upon display of the word cloud 309 and/or the corresponding trendline or may occur when a trendline/text word is selected (e.g., moused-over or clicked on).

The text analytics interface 300 may also provide additional service portal features, such as a user identifier 330, a search button 332, a chat initiation button 334, a help button 336, and a settings button 338. Specific views may be saved and stored for future use. The user identifier 330 identifies a user and/or a role being used by the user viewing the text analytics interface 300. The search button 332 begins a search in the text analytics interface 300 and/or the service portal. The chat initiation button 334 connects the user viewing the text analytics interface 300 with others, such as those making reports or those that can assist in usage of the text analytics interface 300/service portal. The help button 336 provide a knowledge library to access how to use the text analytics interface 300/service portal. The settings button 338 may be used to configure the text analytics interface 300/service portal. For example, a number of displayed trendlines and/or text words in the word cloud 309 may be set using the settings button 338.

Furthermore, as discussed in reference to FIG. 4 below, when a word cloud 309 is generated and/or drilled down using selections of word clouds, the resulting screen may be saved. The screen may be saved to show the exact word cloud 309 and related trendlines and/or a widget may be saved to cause a similar word cloud and related trendlines to be generated at a subsequent time using a save widget button 339. In other words, the words and settings used to create the word cloud 309 and the related timelines may be reapplied to other entries at a later time to generate a new word cloud 309 and related timelines from the newer entries (in addition to or alternative to the entries used to generate the word cloud 309).

Figure 4:
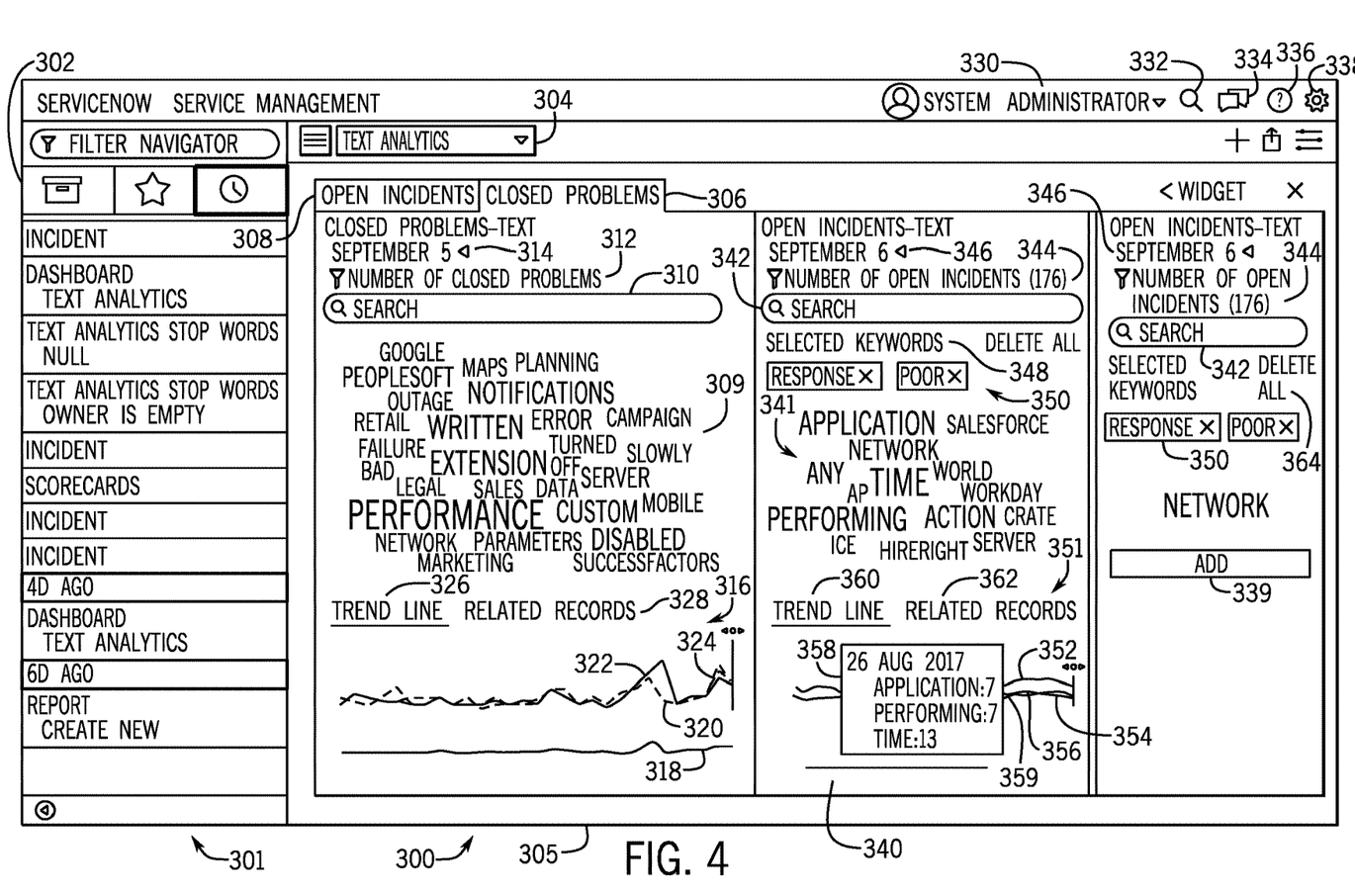
FIG. 4 is the text analytics interface of FIG. 3 with an additional auxiliary frame included, in accordance with an embodiment.

FIG. 4 illustrates the text analytics interface 300 with the analysis frame 305 and an auxiliary analysis frame 340. The auxiliary analysis frame 340 includes a word cloud 341 that may be generated by drilling down (e.g., selecting a text word of) the word cloud 309. Alternatively, the auxiliary analysis frame 340 may correspond to one report type (e.g., open incidents), and the analysis frame 305 corresponds to a different report type (e.g., close problems). The auxiliary analysis frame 340 includes a search bar 342 similar to the search bar 310 and a filter 344 similar to the filter 312. The auxiliary analysis frame 340 includes a date picker 346 that is similar to the date picker 314. When the word cloud 341 is generate using search terms selected from the word cloud 309, selected from the word cloud 341, selected by manual entry into the search bar 342, and/or selected by manual entry into the search bar 310, the selected keywords used to generate/update the word cloud 341 may be displayed under a selected keywords header 348 as the selected keywords 350. The auxiliary analysis frame 340 also includes a trendline interface 351 that is similar to the trendline interface 316. For instance, the trendline interface 351 includes trendlines 352, 354, and 356. Furthermore, the trendline interface 316 includes a legend 358 that clarifies which trendline corresponds which text word of the word cloud 341 at a selected point 359. The trendline interface 316 includes a trendline tab 360 similar to the trendline tab 326, and a related records tab 362 similar to the related records tab 328. Also, as illustrated, a widget 364 may be created from the auxiliary analysis frame 340 using the save widget button 339. As illustrated, the widget 364 includes the search bar 342, the filter 344, and the date picker 346.

Figure 5:
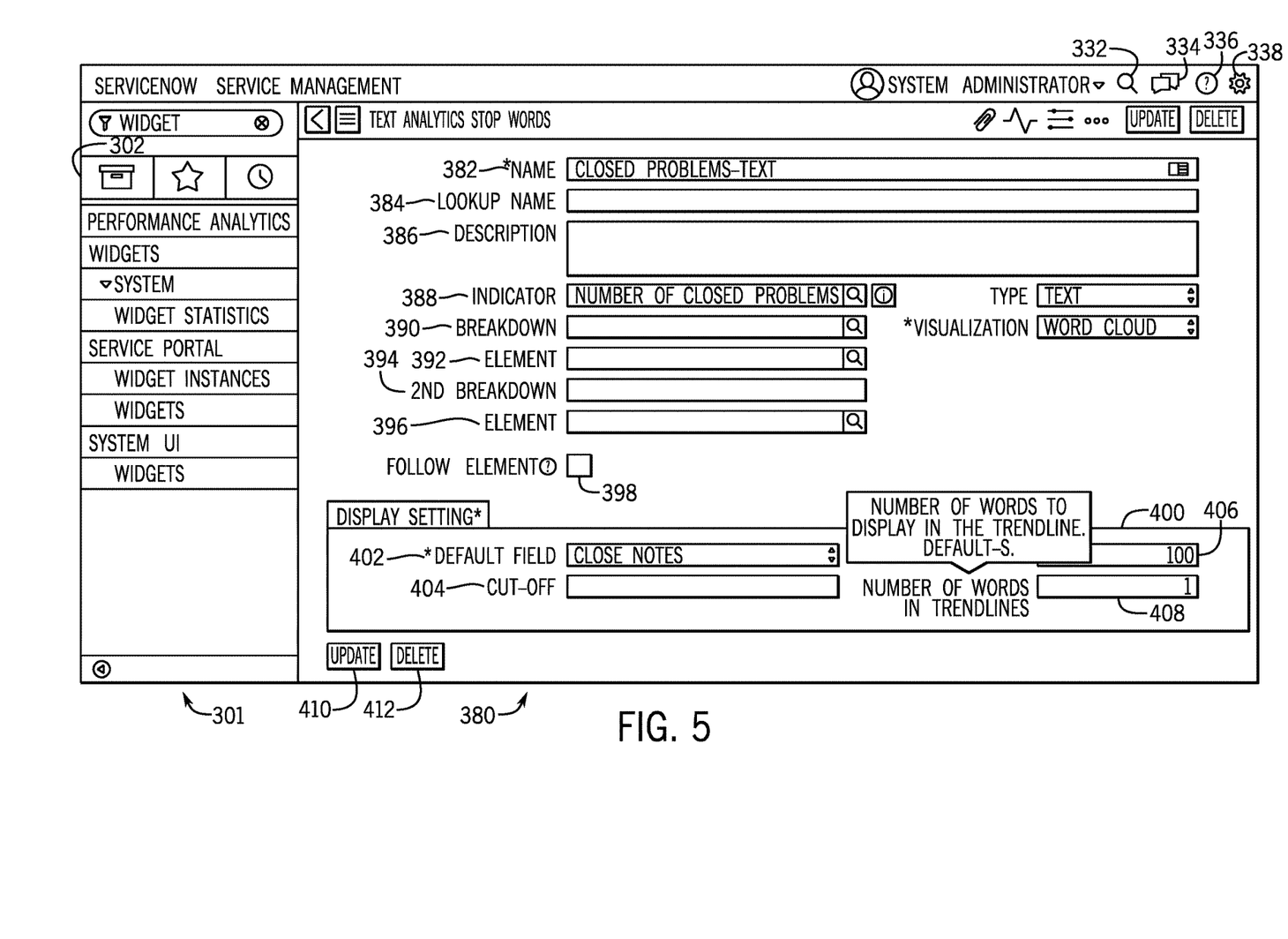
FIG. 5 is a widget configuration screen used to configure widgets of the text analytics interface, in accordance with an embodiment.

Upon selection of the save widget button 339, a widget configuration screen 380 as illustrated in FIG. 5 may be presented. The widget configuration screen 380 includes a title field 382 that may be used to name the widget with its title. The widget configuration screen 380 may also include a lookup name field 384 that may be used to index widgets with searchable terms. For example, similar widgets may have a similar tag that may be searched to find the similar widgets. A description field 386 may be used to provide a brief description of the widget to explain what it does and/or what it is intended to show. An indicator field 388 may be used to modify a displayed indicator for the widget 364. A breakdown field 390 may be used to indicate how to break down the records (e.g., select a keyword). An element field 392 may be used to indicate the element used to breakdown the records according to breakdown field 390. An additional breakdown field 394 may be used to break the records down more, and the additional element field 396 may be used to choose the value used to break the records down more. A follow element radio 398 may be used to select whether to track the element.

The widget configuration screen 380 may also be used to configure an appearance of the text analytics interface 100 in a display setting frame 400. The display setting frame 400 includes a default field 402 that indicates what type of records (e.g., closure notes) are used to obtain the unstructured text. A cut-off field 404 may be used to cut off analysis of the records at a number of records. For example, certain words may not be added to the word cloud unless they pass a threshold number of occurrences. The threshold may be a minimum number or a minimum percentage of records. A number of words in word cloud field 406 may be used to specify how many words are displayed in the word cloud. A number of words in trendlines 408 may be used to specify how many trendlines are displayed in the trendlines interface. The data input into the widget configuration screen 380 may be used to update/save the changes using an update button 410 or cancel the changed using a cancel button 412.

Figure 6:
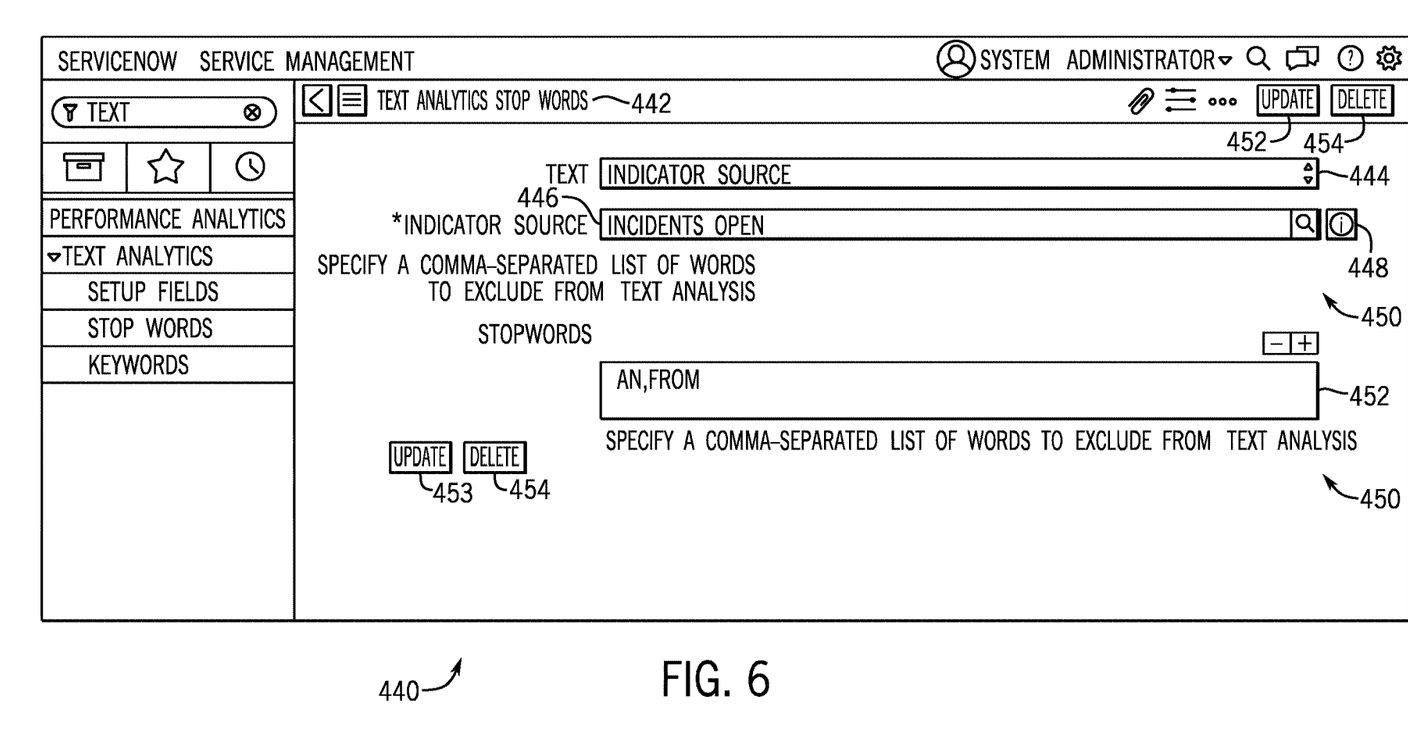
FIG. 6 is a stopwords configuration screen used to create a stopwords lists to filter results in the text analytics interface, in accordance with an embodiment.

In some cases, words that occur quite frequently (e.g., the) may not be particularly useful in analyzing the records. Accordingly, certain words may be omitted as stopwords that are not included in the word cloud and/or trendlines. To enter stopwords, a stopword screen 440, illustrated in FIG. 6, may be used to enter the words to be omitted. The stopwords screen 440 includes title text 442 that indicates that the stopwords screen 440 is active. The stopwords screen 440 also includes a type field 444 that may be used to indicate what type of text words are omitted from the word cloud and/or trendlines. For example, in the illustrated embodiment, the type field 444 indicates that text words from an indicator source are to be filtered using a stopwords list. Based on the type field 444, a type subfield 446 may identify specifics corresponding to the type indicated in the type field 444. For instance, the illustrated embodiment indicates that stopwords from open incidents may be omitted from the word cloud and/or the trendlines. Additionally or alternatively, the stopwords screen 440 may include an information button 448 that may be used to obtain information about the subfield 446 and/or its available entries. The stopwords screen 440 may also include instructions 450 on how to use the utilize the stopwords screen 440. For example, the instructions 450 may instruct a user how to enter words in a text box 452 to generate a stopwords list. Once the stopwords list has been input into the text box 452, the changes may be updated using an update button 453 or canceled using a cancel button 454.

Figure 7:
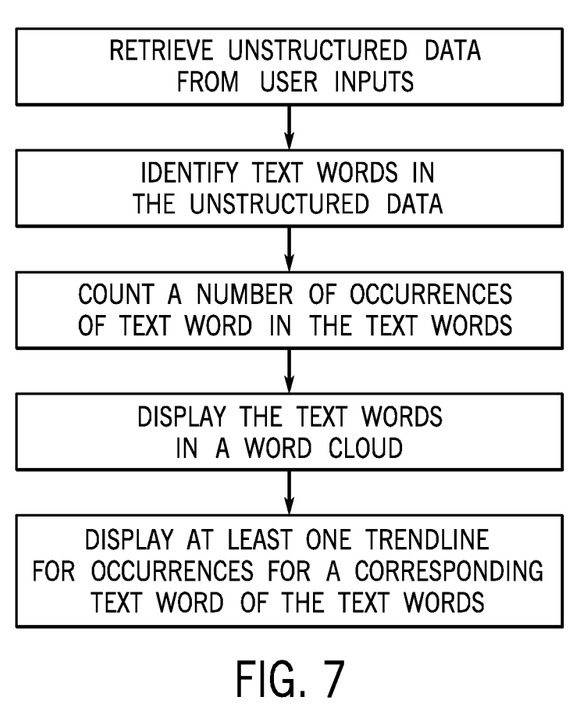
FIG. 7 is a process for utilizing the text analytics interface, in accordance with an embodiment.

FIG. 7 illustrates a process 500 for analyzing unstructured text. The process 500 includes a processor (e.g., processor of application node 116) retrieving unstructured data from user inputs (block 502). These user inputs may include reports including user comments, such as incident report comments, problem report closure notes, open problem report comments, and/or other similar user comment generated unstructured data. These user inputs may be gathered using a data collector that is used for other performance analytics. For example, using the data collector a text index may be created. The data collector may run at a specific frequency (e.g., daily, weekly, monthly, etc.). For each collection frequency, a text index may be generated and stored. For example, the text index may be generated and serialized for indicator sources. In some embodiments, the data collector stores data from previous entries, a real-time record mechanism may be used to supplement the data-collector-generated text indices. For example, an API may be used to build an index for more recent (e.g., today's) records.

The processor then identifies text words in the unstructured data (block 504). As previously noted, text words may include words, acronyms, numbers, non-English alphanumeric character strings that have understood meanings (e.g., company names, terms of art, quasi-acronyms, etc.), or any combination thereof. The processor counts a number of occurrences of text word in the text words (block 506). In some embodiments, certain text words may be grouped in phrases before continuing. Moreover, in some embodiments, plural and singular text words may be combined into a single text word. For example, in some embodiments, connection and connections may be treated as a single word in the word cloud. Furthermore, in some embodiments, the number of occurrences may be counted only once per record (e.g., incident report) from which the unstructured data has come. Alternatively, a total number of occurrences of the text word may be determined for all of the unstructured data regardless of whether multiple occurrences occur in a same record or in multiple records.

Based on the counted occurrences, the processor displays the text words in a word cloud by displaying the text words with a size corresponding to the number of occurrences of the respective text word of the text words (block 508). In the word cloud, a larger number of occurrences results in a larger size of the respective text word when displayed. The processor also displays at least one trendline for occurrences for a corresponding text word of the text words (block 510). In some embodiments, the most frequently occurring text words in the word cloud are also shown in a trendline. By presenting the number and the trend, a quick glance may be sufficient to estimate whether the occurrences of the word have been continuous and/or are likely to continue without intervention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   one or more processors; and memory having instructions thereon that, when executed, are configured to cause the one or more processors to:

retrieve unstructured data from a plurality of user inputs, wherein the plurality of user inputs comprises an incident report or a problem report;

identify a plurality of text words in the unstructured data;

count a number of occurrences of each text word in the plurality of text words;

display the plurality of text words in a word cloud by displaying each of the plurality of text words with a size corresponding to the number of occurrences of the respective text word of the plurality of text words, wherein a larger number of occurrences results in a larger size of the respective text word when displayed;

cause display of a plurality of trendlines for occurrences for a corresponding text word of the plurality of text words, wherein displaying the plurality of trendlines comprises displaying a visual indicator for each trendline of the plurality of trendlines indicating that the respective trendline matches a corresponding text word in the word cloud; and save, in the memory, words and settings used to generate the plurality of trendlines and the word cloud for reapplication to generate different word clouds and trendlines from different unstructured data at a later time.

2. The system of claim 1, wherein retrieving the unstructured data comprises receiving the unstructured data in a plurality of reports from a remote computing device.

3. The system of claim 1, wherein the unstructured data comprises text that is input into a comment field of the incident report or the problem report.

4. The system of claim 1, wherein the unstructured data comprises incident reports related to technical support for devices or services.

5. The system of claim 1, wherein the instructions are configured to cause the one or more processors to:
receive an indication of a stopword; and
omit any occurrence of the stopword in the unstructured data from the plurality of text words.

6. The system of claim 1, wherein the instructions are configured to cause the one or more processors to:
receive a selection of a first text word of the plurality of text words in the displayed plurality of text words;
size a remaining plurality of text words strings by:
removing records that do not include the first text word from the unstructured data as remaining unstructured data to form the remaining plurality of text words; and
counting a number of occurrences of each text word of the remaining plurality of text words in the remaining unstructured data; and
cause display of the remaining plurality of text words by displaying each text word corresponding to the number of occurrences of the respective text word of the plurality of text words in the remaining unstructured data, wherein a larger number of occurrences results in a larger size of the respective text word when displayed.

7. The system of claim 1, wherein displaying the plurality of trendlines comprises displaying the plurality of trendlines concurrently while displaying the plurality of text words.

8. The system of claim 1, wherein the text word comprises a number, an acronym, or a combination thereof.

9. The system of claim 1, wherein the text words are separated in the unstructured data by whitespace characters or punctuation in the unstructured data.

10. The system of claim 9, wherein the whitespace character comprises an ASCII space or a tab.

11. A method comprising:
retrieve unstructured data from a plurality of user inputs, wherein the plurality of user inputs comprises a plurality of reports;
identify a plurality of text words in the unstructured data;
count a number of occurrences of each text word in the plurality of text words;
display the plurality of text words in a word cloud by displaying each of the plurality of text words with a size corresponding to the number of occurrences of the respective text word of the plurality of text words, wherein a larger number of occurrences results in a larger size of the respective text word when displayed;
display a plurality of trendlines for occurrences of the plurality of text words, wherein displaying the plurality of trendlines comprises displaying a visual indicator for each trendline of the plurality of trendlines indicating that the respective trendline matches a corresponding text word in the word cloud;
save settings used to generate the word cloud and the plurality of trendlines;
retrieve an additional plurality of text words in additional data from an additional plurality of reports, wherein the additional plurality of reports has a different type than a type of the plurality of reports;
display the additional plurality of text words in an additional word cloud in an auxiliary frame using the saved settings; and
display an additional plurality of trendlines for occurrences of the additional plurality of text words using the saved settings.

12. The method of claim 11, wherein counting the number of occurrences comprises counting the respective text word once per report of the plurality of reports.

13. The method of claim 11, wherein counting the number of occurrences comprises counting each occurrence of the respective text word multiple times in a report of the plurality of reports.

14. The method of claim 11, wherein retrieving, identifying, counting, and displaying is performed in a multi-instance architecture having a primary virtual machine and a second virtual machine.

15. The method of claim 11, wherein the plurality of reports comprises records corresponding to incident reports or problem reports.

16. Tangible, non-transitory, and computer-readable medium having instructions stored thereon, wherein the instructions are configured to cause one or more processors to:
retrieve unstructured data from a report comprising a plurality of user inputs, wherein the report comprises a plurality of incident reports or problem reports;
identify a first plurality of text words in the unstructured data;
count a number of occurrences of each text word in the first plurality of text words;
cause display of the first plurality of text words in a first word cloud in a first frame by displaying one or more of the first plurality of text words with a size corresponding to the number of occurrences of the respective text word of the first plurality of text words, wherein a larger number of occurrences results in a larger size of the respective text word when displayed;

cause display of a first plurality of trendlines in the first frame for occurrences for corresponding text words of the first plurality of text words, wherein causing display of the first plurality of trendlines comprises causing display of a visual indicator for each trendline of the first plurality of trendlines indicating that the respective trendline matches a corresponding text word in the first word cloud;

save settings used to generate the first word cloud and the first plurality of trendlines;

cause display of a second plurality of text words in a second word cloud in a second frame using the saved settings; and cause display of a second plurality of trendlines in the second frame using the saved settings, wherein the first plurality of text words and the second plurality of text words correspond to different time periods of compiled incident reports or problem reports.

17. The tangible, non-transitory, and computer-readable medium of claim 16, wherein the instructions are configured to cause the one or more processors to receive a limit on a number of text words in the unstructured data to be included in the first word cloud, wherein displaying one or more of the first plurality of text words comprises displaying no more than the number of text words in the first word cloud.

18. The tangible, non-transitory, and computer-readable medium of claim 16, wherein the instructions are configured to cause the one or more processors to receive a limit on a number of the first plurality of trendlines, wherein displaying the first plurality of trendlines comprises displaying no more trendlines than the limit on the number.

19. The tangible, non-transitory, and computer-readable medium of claim 16, wherein the visual indicator of each trendline of the first plurality of trendlines comprises a color that is the same color as used to fill the corresponding text word in the first word cloud.

20. The system of claim 1, wherein the visual indicator of each trendline of the plurality of trendlines comprises a color that is the same color as used to fill the corresponding text word in the word cloud.

* * * * *